(12) United States Patent
Kanemoto et al.

(10) Patent No.: US 6,391,957 B1
(45) Date of Patent: May 21, 2002

(54) EMULSION RELEASE COATING COMPOSITION

(75) Inventors: Kouji Kanemoto, Ono; Sadahiko Nishikawa, Sisou-gun, both of (JP)

(73) Assignee: Ipposha Oil Industries Co., Ltd., Hyogo (JP)

( * ) Notice: Subject to any disclaimer, the term of this patent is extended or adjusted under 35 U.S.C. 154(b) by 0 days.

(21) Appl. No.: 09/295,347

(22) Filed: Apr. 21, 1999

(51) Int. Cl.$^7$ .................................................. C08K 5/06
(52) U.S. Cl. ........................ 524/376; 524/375; 524/378; 524/503; 524/557
(58) Field of Search ................................ 524/378, 557, 524/376, 375, 503

(56) References Cited

U.S. PATENT DOCUMENTS

| | | | |
|---|---|---|---|
| 2,532,011 A | * | 11/1950 | Dahlquist et al. |
| 5,225,480 A | * | 7/1993 | Tseng et al. ................. 524/813 |
| 5,516,865 A | * | 5/1996 | Urquiola ................... 526/329.7 |
| 5,990,238 A | * | 11/1999 | Dizio et al. .................... 525/60 |

FOREIGN PATENT DOCUMENTS

| | | |
|---|---|---|
| EP | 0189978 A1 | 8/1986 |
| JP | 3-0866778 A | 4/1991 |
| JP | 8-176372 A | 7/1996 |
| JP | 9-011388 A | 1/1997 |
| JP | 9-104851 A | 4/1997 |
| JP | 9-324172 A | 12/1997 |

* cited by examiner

Primary Examiner—Judy M. Reddick
(74) Attorney, Agent, or Firm—Nixon & Vanderhye

(57) ABSTRACT

An aqueous emulsion-type release coating composition comprising (i) a product produced by reaction of an ethylene-vinyl alcohol copolymer represented by the formula (1):

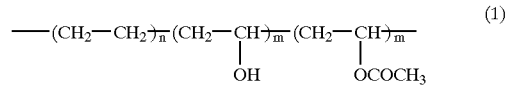

wherein the sum of n, m and m' is an integer of 300–3,000, ratio of n/(n+m+m') is 0.1–0.9, and ratio of m/(m+m') is 0.9–1.0, with a $C_{8-30}$ alkyl isocyanate, and (ii) a surface active agent which is a combination of a nonionic surface active agent having a hydrophilic-lyophilic balance (HLB) of not larger than 12, with an ionic surface active agent. The release coating composition is used as a release agent for a pressure sensitive adhesive tape or contact sheet.

5 Claims, No Drawings

EMULSION RELEASE COATING COMPOSITION

BACKGROUND OF THE INVENTION (1) Field of the Invention

This invention relates to a release coating composition used for a pressure sensitive adhesive tape or contact sheet, and to a pressure sensitive adhesive tape or contact sheet. More particularly, it relates to an aqueous emulsion type release coating composition used for a pressure sensitive adhesive tape or contact sheet, which has a base such as a thermoplastic plastic film. The invention further relates to a pressure sensitive adhesive tape or contact sheet.

(2) Description of the Related Art

A pressure sensitive adhesive tape or contact sheet has an adhesive layer formed on a major surface thereof and is protected by a cover sheet. When the pressure sensitive adhesive tape or contact sheet is used, the cover sheet is peeled therefrom. A surface of the cover sheet, which is placed in contact with the adhesive layer, is coated with a release coating composition for easy peeling of the cover sheet from the adhesive layer.

As examples of the release coating composition, there can be mentioned a silicone release coating composition and a non-silicone release coating composition. The silicone release coating composition includes an addition type silicone or a condensation type silicone. The silicone release coating composition exhibits excellent releasability, residual adhesion and heat resistance, but is expensive, and must be heat-cured at a high temperature and thus is difficult or even impossible to apply to a plastic film, especially a thermoplastic film.

The non-silicone release coating composition comprises, for example, a long chain alkyl pendant type polymer. The non-silicone release coating composition generally has releasability and other characteristics, which are inferior to those of the silicone release coating composition. But, a non-silicone release coating composition comprising a long chain alkyl pendant type polymer, as described in, for example, Japanese Examined Patent Publication No. 60-30355, exhibits releasability which is acceptable to a satisfying extent, and thus is widely used. Further, this non-silicone release coating composition is advantageous in that there is no need of using a special catalyst nor curing at a high temperature. Releasability can be obtained merely by coating a base film with a solution of the release coating composition in a solvent, followed by drying, and therefore, the release coating composition can advantageously be applied to a base film having a poor heat resistance such as a thermoplastic film. However, the long chain pendant type polymer is insoluble in water and must be used as a solution in an organic solvent.

However, in recent years, a deep interest is felt on problem of safety and environment, and thus, an aqueous release coating composition is eagerly desired. Proposals of an aqueous emulsion type release coating composition as an aqueous release coating composition have been made. For example, in Japanese Unexamined Patent Publication (hereinafter abbreviated to "JP-A") No. H3-86,778, an aqueous release coating composition comprising an aqueous emulsion of a long chain alkyl pendant type polymer, which is a product produced by reaction of polyvinyl alcohol or a modified product thereof with an alkyl isocyanate, is proposed. In JP-A H8-176,372, an aqueous release coating composition comprising an aqueous dispersion of (i) a product produced by reaction of a saponified vinyl acetate copolymer having a specific polymerization degree and saponification degree with a long chain alkyl compound having a functional group capable of reacting with hydroxyl groups of the saponified vinyl acetate copolymer, and (ii) an acid-modified olefin copolymer with a specific acid value.

The heretofore proposed aqueous emulsion type release coating compositions have poor storage stability, i.e., when the coating compositions are allowed to stand for a long period, the long chain alkyl pendant-type polymer contained as an effective ingredient is readily precipitated or coagulated. Further, the aqueous emulsion type release coating compositions have releasability and residual adhesion, which are inferior to those of non-aqueous release coating compositions containing an organic solvent.

SUMMARY OF THE INVENTION

A primary object of the present invention is to provide an emulsion-type release coating composition exhibiting high and balanced releasability and residual adhesion, and having good storage stability.

Another object of the present invention is to provide a pressure sensitive adhesive tape or contact sheet exhibiting high and balanced releasability and residual adhesion.

In accordance with the present invention, there is provided an aqueous emulsion-type release coating composition comprising (i) a product produced by reaction of an ethylene-vinyl alcohol copolymer represented by the following formula (1):

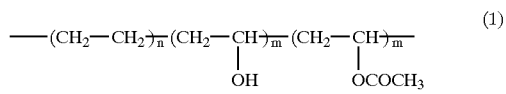

wherein the total of n, m and m' is an integer of 300 to 3,000, the ratio of n/(n+m+m') is in the range of 0.1 to 0.9, and the ratio of m/(m+m') is in the range of 0.9 to 1.0, with a $C_{8-30}$ alkyl isocyanate (said product is hereinafter referred to as "modified Et-VAl copolymer" when appropriate), and (ii) a surface active agent which is a combination of a nonionic surface active agent having a hydrophilic-lyophilic balance (HLB) of not larger than 12, with an ionic surface active agent.

In accordance with the present invention, there is further provided a pressure sensitive adhesive tape or contact sheet, having a laminate structure composed of superposed base films or a wound base film, each of which has a layer of a pressure sensitive adhesive formed on one surface thereof, and a layer of a release coating composition formed on the other surface thereof so that the release coating composition layer is in direct contact with the pressure sensitive adhesive layer formed on one surface of the adjacent base film; said release coating composition being the above-mentioned aqueous emulsion type release coating composition.

DESCRIPTION OF THE PREFERRED EMBODIMENTS

The aqueous emulsion-type release coating composition of the present invention is characterized as containing a combination of a nonionic surface active agent having a low HLB, i.e., a HLB of not larger than 12, (hereinafter abbreviated to "low-HLB surfactant" when appropriate) and an ionic surface active agent (hereinafter abbreviated to "high-HLB surfactant" when appropriate).

In general, in order to prepare an aqueous polymer emulsion by emulsifying the polymer with a surface active agent, a surface active agent having a HLB falling between that of water and that of the polymer is used as an emulsifier. However, the modified Et-VAl copolymer used in the present invention has an extremely hydrophobic polymer, and therefore, a surface active agent used for the preparation of an aqueous emulsion of the modified Et-VAl copolymer must be appropriately chosen. If a surface active agent having a high HLB is used, it has poor affinity for and compatibility with the modified Et-VAl copolymer, and thus, the modified Et-VAl copolymer is difficult to emulsify. In contrast, a surface active agent having a low HLB is used, it has good affinity for and compatibility with the modified Et-VAl copolymer, but the surface active agent is too hydrophilic to emulsify the modified Et-VAl copolymer.

A nonionic surface active agent having a HLB not larger than 12, i.e., a low-HLB surfactant, used in the present invention exhibits a high affinity for the modified Et-VAl copolymer. An ionic surface active agent, i.e., a high-HLB surfactant, used in the present invention exhibits a high affinity for water as ionic surface active agents generally do. The high-HLB surfactant and the low-HLB surfactant are compatible with each other. Therefore, the modified Et-VAl copolymer can be easily emulsified with a combination of the two surfactants. The thus-prepared aqueous emulsion of the modified Et-VAl copolymer is of an oil-in-water (O/W) type.

The nonionic surface active agent having a HLB of not larger than 12 preferably includes polyoxyethylene alkyl-ether type surface active agents having a HLB of not larger than 12. The polyoxyethylene alkyl-ether type surface active agents having a HLB of not larger than 12 have a high affinity for the modified Et-VAl copolymer and, when a release coating composition made therewith is coated on a film and heat-treated to be dried, undesirable bleeding of the nonionic surface active agent can be prevented. Therefore, although a surface active agent is used, good releasability achieved with the modified Et-VAl copolymer can be retained, and reduction of residual adhesion caused by the ingredients in an aqueous emulsion type release coating composition can be prevented or minimized.

As preferable examples of the polyoxyethylene alkyl-ether type surface active agent, there can be mentioned polyoxyethylene $C_{8-20}$ alkyl-ethers.

The ionic surface active agents used in the present invention preferably include an anionic surface active agent and a cationic surface active agent. When any of anionic surface active agents and cationic surface active agents are used in combination with a nonionic surface active agent having a HLB of not larger than 12, the ethylene-vinyl alcohol copolymer can easily be emulsified.

The amount of the nonionic surface active agent used is preferably in the range of 10 to 60% by weight, based on the weight of the entire reaction product of the modified Et-VAl copolymer with $C_{8-30}$ alkyl isocyanate. The ratio of the nonionic surface active agent/the ionic surface active agent is preferably in the range of 0.3 to 30 by weight.

Modified Et-VAl Copolymer

In the ethylene-vinyl alcohol copolymer of formula (1) used for the preparation of the modified Et-VAI copolymer, the sum of (n+m+m') is an integer of 300 to 3,000, preferably 500 to 2,500. If the polymerization degree of the ethylene-vinyl alcohol copolymer is too small, releasability of the release coating composition is poor. In contrast, the polymerization degree of the copolymer is too large, dispersibility of the modified Et-VAl copolymer in water is reduced.

The ratio of n/(n+m+m'), namely, the ratio by mole of ethylene units in the ethylene-vinyl alcohol copolymer, is in the range of 0.1 to 0.9, preferably 0.2 to 0.6.

The ratio of m/(m+m') is in the range of 0.9 to 1.0, namely, the saponification degree of the ethylene-vinyl alcohol copolymer is in the range of 90 to 100% by mole. If the saponification degree is smaller than 90% by mole, the modified Et-VAl copolymer has a low melting point and an increased affinity for an adhesive composition, and thus, the release coating composition is liable to migrate into the adhesive layer with the result of reduction of releasability.

In the $C_{8-30}$ alkyl isocyanate used for the modified Et-VAl copolymer, the alkyl group has 8 to 30 carbon atoms, preferably 8 to 20 carbon atoms. A straight chain alkyl group is preferable. As specific examples of the $C_{8-30}$ alkyl isocyanate, there can be mentioned octyl isocyanate, lauryl isocyanate (i.e., dodecyl isocyanate) and stearyl isocyanate (i.e., octadecyl isocyanate).

The modified Et-VAl copolymer is prepared by reacting the ethylene-vinyl alcohol copolymer of formula (1) with the $C_{8-30}$ alkyl isocyanate. More specifically, the ethylene-vinyl alcohol copolymer of formula (1) is dissolved in an organic solvent such as dimethyl sulfoxide, and the alkyl isocyanate is added to the copolymer solution at an elevated temperature, for example, about 80° C., with stirring to dissolve the alkyl isocyanate. If desired, a catalyst such as dibutyltin dilaurate is added, and the temperature of the mixture is further elevated to, for example, about 140° C. whereby the ethylene-vinyl alcohol copolymer is reacted with the alkyl isocyanate to give the modified Et-VAl copolymer.

The amount of the alkyl isocyanate used is not particularly limited, but is usually at least 0.5 mole, preferably 0.5 to 1.5 moles and more preferably 0.6 to 1.1 moles.

The termination of the reaction can be confirmed, for example, by measuring the amount of unreacted alkyl isocyanate remaining in the reaction mixture by the infrared spectroscopic analysis.

The modified Et-VAl copolymer produced can be separated from the reaction mixture by a conventional procedure, for example, a precipitation procedure. For example, the as-obtained reaction mixture is cooled to 80° C., and then, incorporated in a bath of an alcohol such as methanol or isopropyl alcohol in an amount of 3 to 6 times of the amount of the reaction mixture whereby the modified Et-VAl copolymer is precipitated or coagulated. The precipitated or coagulated polymer is washed with an alcohol such as methanol or isopropyl alcohol, thus being separated.

The modified Et-VAl copolymer may be used either alone or in combination. The amount of the modified Et-VAl copolymer incorporated in the release coating composition of the present invention is not particularly limited and can be varied depending upon the kind of pressure-sensitive adhesive. Usually the amount of the modified Et-VAl copolymer is in the range of 1 to 20% by weight, preferably 5 to 15% by weight, based on the weight of the aqueous emulsion-type release coating composition. When the amount of the modified Et-VAl copolymer is too small, the adhesion between the pressure sensitive adhesive tape or adhesive sheet and the protective cover sheet is reduced. In contrast, when the amount of the modified Et-VAl copolymer is too large, a precipitate of unemulsified copolymer tends to be produced in the release coating compsosition.

Nonionic Surface Active Agent

The nonionic surface active agent used in combination with an ionic surface active agent in the present invention has a hydrophilic-lyophilic balance (HLB) of not larger than 12, usually in the range of 3 to 12, preferably 5 to 10 and more preferably 6 to 10. If the HLB of the nononic surface active agent is larger than 12, the releasability and residual adhesion are reduced.

The nonionic surface active agent used includes, for example, polyoxyethylene alkyl-ether type surface active agents (including a straight chain polymer and a branched chain polymer), polyoxyethylene alkyl-phenyl-ether type surface active agents, polyoxyethylene fatty acid ester type surface active agents, polyoxyethylene polyhydric alcohol fatty acid ester type surface active agents, polyoxyethylene higher-alkylamine fatty acid ester type surface active agents, polyoxyethylene fatty acid-amide type surface active agents, fatty acid esters of polyhydric alcohols (for example, pentaerythritol, sorbitol and sucrose), and alkanolamides. The nonionic surface active agents may be used either alone or in combination.

As specific examples of the polyoxyethylene alkyl-ether type surface active agent, there can be mentioned polyoxyethylene $C_{8-20}$ (preferably $C_{8-18}$) alkyl ethers such as polyoxyethylene decyl ether, polyoxyethylene lauryl ether (i.e., polyoxyethylene dodecylether), polyoxyethylene tetradecyl ether, polyoxyethylene pentadecyl ether, polyoxyethylene hexadecyl ether and polyoxyethylene stearyl ether (i.e., polyoxyethylene hexadecyl ether). As specific examples of the polyoxyethylene alkyl-phenyl-ether type surface active agent, there can be mentioned polyoxyethylene $C_{8-20}$ (preferably $C_{8-18}$) alkyl-phenyl-ethers such as polyoxyethylene nonyl-phenyl-ether.

In the nonionic surface active agents, especially polyoxyethylene alkyl ether type surface active agents, the hydrophobic hydrocarbon group, i.e., alkyl group, has at least 8, usually 8 to 20, preferably 8 to 18 carbon atoms. The alkyl group may be either straight chain or branched, but is preferably straight chain. This is because, when a release coating composition containing a nonionic surface active agent having a straight chain alkyl group is coated on a film and is then heat-dried, bleeding of the nonionic surface active agent from the coating can be prevented or minimized, with the results that good releasability achieved with the modified Et-VAl copolymer can be retained, and reduction of residual adhesion caused by the ingredients in an emulsion type release coating composition can be prevented or minimized. Thus, polyoxyethylene alkyl ether type surface active agents, especially those having a straight chain alkyl group, are preferable as the nonionic surface active agent.

Ionic Surface Active Agent

The ionic surface active agent used in combination with the nonionic surface active agent includes an anionic surface active agent, a cationic surface active agent and an ampholytic surface active agent. The ionic surface active agent may be used either alone or in combination.

As specific examples of the ionic surface active agent, there can be mentioned alkylsulfuric acid ester salts such as sodium $C_{10-18}$ alkylsulfate esters, for example, sodium laurylsulfate ester; alkyl-ether-sulfuric acid ester salts such as sodium $C_{10-18}$ alkyl-ether-sulfate esters, for example, sodium lauryl-ether-sulfate ester; alkyl-diphenyl-ether-disulfuric acid salts such as sodium $C_{10-18}$ alkyl-diphenyl-ether-disulfate, for example, sodium lauryl-diphenyl-ether-disulfate; alkylbenzenesulfonic acid salts such as sodium $C_{10-18}$ alkylbenzenesulfonate; sulfosuccinic acid salts such as sodium sulfosuccinate; dialkylsulfosuccinic acid salts such as sodium di-$C_{10-18}$ alkylsulfosuccinates; aliphatic monocarboxylic acid salts; N-acyloylglutamic acid salts; alkylnaphthalenesulfonic acid salts such as sodium alkylnaphthalenesulfonate; olefin-sulfonic acid salts such as sodium α-olefin-sulfonate; sulfurized fatty acid esters; sulfurized olefins; and phosphoric acid ester salts. Of these, alkylsulfuric acid ester salts, alkyl-ether-sulfuric acid ester salts, alkyl-diphenyl-ether-disulfonic acid ester salts are preferable.

As specific examples of the cationic surface active agent, there can be mentioned alkylammonium salts such as alkylammonium halides, for example, laurylammonium chloride; alkyltrimethyl-ammonium halides; trimethylaminoethylakylamide halides; alkylpyridinium sulfuric acid salts; and alkyldimethylbenzyl-ammonium salts. Of these, alkylammonium salts are preferable.

As specific examples of ampholytic surface active agents, alkyltrimethylaminoacetic acids, alkyldiethylenetriaminoacetic acids, alkylaminopropionic acids and alkyldimethylbetaines.

Among the ionic surface active agents, anionic surface active agents and cationic surface active agents are preferable. Especially anionic or cationic surface active agents which have a hydrophobic group, such as an alkyl group, having a large number of carbon atoms, for example, about 10 to 20 carbon atoms. In the anionic surface active agents and cationic surface active agents, the structure of the hydrophobic group may have either a straight chain structure or a branched chain structure, but a straight chain structure is preferable because a hydrophobic group with a straight chain structure gives only a slight influence on the releasing properties. That is, when a release coating composition containing an anionic or cationic surface active agent having a straight chain alkyl group is coated on a film and the coating is heat-treated and dried, bleeding of the anionic or cationic surface active agent can be prevented or minimized.

The amount of the nonionic surface active agent is usually in the range of 10 to 60% by weight, preferably 10 to 50% by weight, based on the total amount of the modified Et-VAl copolymer. The amount of the ionic surface active agent is usually in the range of 2 to 30% by weight, preferably 5 to 20% by weight, based on the total amount of the modified Et-VAl copolymer. The ratio of the nonionic surface active agent/the ionic surface active agent is usually in the range of 0.3 to 30 by weight, preferably 0.5 to 10 by weight.

Emulsion Type Release Coating Composition

The aqueous emulsion type release coating composition of the present invention comprises the above-mentioned modified Et-VAl copolymer, nonionic surface active agent and ionic surface active agent.

If desired, organic solvents such as higher alcohols, for example, decyl alcohol, and petroleum hydrocarbons, may be incorporated in the release coating composition. In the case where the organic solvent is used, its amount is preferably not larger than 25% by weight based on the weight of the modified Et-VAl copolymer.

The aqueous emulsion type release coating composition is prepared by emulsifying the modified Et-VAl copolymer by using a combination of the nonionic surface active and the ionic surface active agent. More specifically. the modified Et-VAl copolymer, the nonionic surface active agent, the ionic surface active agent, an optional organic solvent and a predetermined amount of water are mixed together. By using an apparatus capable of emulsifying the mixture under a high pressure (i.e., a high-pressure emulsifier), the mixture is stirred at a high temperature, for example, about 100° C. and at a low-rate of revolution, for example, about 100 to 200 rpm, and then, the stirring is continued at a higher rate of revolution, for example, about 400 to 700 rpm and at a high temperature, for example, about 100° C., to prepare a pre-emulsion. The remainder of water is added to the pre-emulsion with stirring and the mixture is cooled to give the aqueous emulsion type release coating composition.

Pressure Sensitive Adhesive Tape or Contact Sheet

The aqueous emulsion type release coating composition of the present invention is applicable to various pressure sensitive tapes or contact sheets, and pressure sensitive label paper or sheets. The aqueous emulsion type release coating composition is especially suitable for a pressure sensitive adhesive tape or contact sheet having a laminate structure composed of superposed base films or a wound base film, each of which has a layer of a pressure sensitive adhesive formed on one surface thereof, and a layer of a release coating composition formed on the other surface thereof so that the release coating composition layer is in direct contact with the pressure sensitive adhesive layer formed on one surface of the adjacent base film. The aqueous emulsion type release coating composition also is suitable for a pressure sensitive adhesive label paper or sheet having a laminate structure composed of a base film having a layer of a pressure sensitive adhesive formed on one surface thereof, and a protecting sheet having a layer of a release coating composition formed on one surface thereof; the base film being superposed on the protecting sheet so that the pressure sensitive adhesive layer is in direct contact with the release coating composition layer.

The aqueous emulsion type release coating composition of the present invention is coated on a back surface (i.e, a surface to be placed in contact with an adhesive) of a pressure sensitive adhesive tape or contact sheet, or on a surface of a protecting cover sheet of a pressure sensitive label paper or sheet. The coating can be conducted by using a conventional apparatus, for example, a roll coater, a gravure coater, a Mayer bar coater or a lip coater.

The base film or sheet of the pressure sensitive adhesive tape or contact sheet, and the base sheet of the protecting cover sheet are not particularly limited, and include, for example, thermoplastic films and sheets made of polyethylene, polypropylene, polyester such as polyethylene terephthalate, and cellophane, i.e., cellulose acetate; papers such as woodfree paper, craft paper, crepe paper and glassine paper; seal-coated papers such as impregnated paper and plastic-coated paper; and cloths. The coated surface of plastic film or sheet may be surface-treated by a conventional surface-treating procedure such as corona discharge treatment or plasma treatment.

The invention will now be described by the following examples, but is by no means limited by the examples. In the examples, parts are by weight.

PREPARATION EXAMPLE 1

Preparation of Modified Et-VAl Copolymer A

A reactor equipped with a stirrer having Pfaudler vanes, a reflux condenser and a dropping funnel, which is capable of being heated and cooled, is charged with 100 parts of dimethylsulf oxide (DMSO), and then, 10 parts of an ethylene-vinyl alcohol containing about 10% by mole of ethylene units and having an average polymerization degree of about 1,000 and a saponification degree of 98% (which copolymer is hereinafter abbreviated to "PEVA-10/1000") was added with stirring to dissolve PEVA-10/1000 in DMSO. The thus-prepared solution was heated to about 80° C., and 49 parts of stearyl isocyanate was added. Then dibutyltin dilaurate was gradually added to the solution with stirring. Then the solution was heated to about 140° C. while being stirred, and stirring was continued at that temperature to effect a reaction.

While the progress of reaction was confirmed, the solution was maintained at about 140° C. for about 90 minutes to complete the reaction. The confirmation of the progress of reaction was conducted by withdrawing samples from the liquid reaction mixture at predetermined intervals and measuring the amount of stearyl isocyanate in each sample by the infrared photospecrometry.

After the completion of reaction, the reaction mixture was cooled to 80° C., and poured into a methanol bath in an amount of 5 times of the entire reaction mixture to give a white precipitate. The white precipitate was separated by filtration, and washed with methanol, followed by drying and pulverization to give a modified Et-VAl copolymer A.

PREPARATION EXAMPLE 2

Preparation of Modified Et-VAl Copolymer B

The procedures of Preparation Example 1 were repeated to prepare a modified Et-VAl copolymer B wherein an ethylene-vinyl alcohol copolymer containing about 20% of ethylene and having an average polymerization degree of about 1,300 and a saponification degree of 95% was used instead of PEVA-10/1000, and the amount of stearyl isocyanate was changed to 56 parts with all other conditions remaining the same.

PREPARATION EXAMPLE 3

Preparation of Modified Et-VAl Copolymer C

The procedures of Preparation Example 1 were repeated to prepare a modified Et-VAl copolymer B wherein an ethylene-vinyl alcohol copolymer containing about 30% of ethylene and having an average polymerization degree of abut 1,700 and a saponification degree of 98% was used instead of PEVA-10/1000, and the amount of stearyl isocyanate was changed to 64 parts with all other conditions remaining the same.

EXAMPLE 1

(Preparation of Release Coating Composition "a")

A high-pressure emulsifier (tradename "Autoclave" supplied by Nito Koatsu K.K.) was charged with a mixture of 10 parts of modified Et-VAl copolymer A, 2.5 parts of polyoxyethylene stearyl ether having an ethylene oxide (EO) content of 3.3 moles and an HLB of 8.0, 0.5 part of sodium lauryl-diphenyl-ether sulfonate, 1.5 parts of a petroleum hydrocarbon solvent having a boiling point of about 165° C., and 17 parts of water. The content was stirred at 100° C. and a revolution rate of 150 rpm for 10 minutes, and further stirred at that temperature and an enhanced revolution rate of 500 rpm for 1.5 hours to effect pre-emulsification. To the thus-obtained pre-emulsion, 68.5 parts of water was added, and the mixture was stirred for 0.5 hours and then cooled to 40° C. to give an aqueous emulsion type release coating composition "b".

EXAMPLE 2

(Preparation of Release Coating Composition "b")

The procedures of Example 1 were repeated to prepare an aqueous emulsion type release coating composition "b" wherein a pre-emulsion was prepared from a mixture of 10 parts of modified Et-VAl copolymer B, 5 parts of polyoxyethylene decyl ether having an EO content of 3 moles and an HLB of 9.0, 1 part of sodium lauryl-ether sulfate, 2 parts of decyl alcohol and 18 parts of water, and the amount of water added after the pre-emulsification was changed to 64 parts with all other conditions remaining the same.

EXAMPLE 3
(Preparation of Release Coating Composition "c")

A reactor equipped with a stirrer, a reflux condenser and a dropping funnel, which is capable of being heated and cooled, is charged with 10 parts of modified Et-VAl copolymer A, 5 parts of polyoxyethylene decyl ether having an EO content of 3 moles and an HLB of 9.0, 1 part of monolaurylammonium chloride, 2 parts of decyl alcohol and 18 parts of water, and the content was stirred at 90° C. and a revolution rate of 150 rpm for 10 minutes, and further stirred at 95° C. and a revolution rate of 500 rpm for 2 hours to effect pre-emulsification. To the thus-obtained pre-emulsion, 64 parts of water was added and stirred for 0.5 hour, and then, cooled to 40° C. to give an aqueous emulsion type release coating composition "c".

EXAMPLE 4
(Preparation of Release Coating Composition "d")

The procedures of Example 3 were repeated to prepare an aqueous emulsion type release coating composition "d" wherein a pre-emulsion was prepared from a mixture of 10 parts of modified Et -VAl copolymer C, 2.5 parts of polyoxyethylene oleyl ether having an EO content of 5 moles and an HLB of 8.7, 0.5 part of sodium sulfosuccinate, 1 part of decyl alcohol and 18 parts of water, and the amount of water added after the pre-emulsification was changed to 68 parts with all other conditions remaining the same.

COMPARATIVE EXAMPLE 1
Preparation of Release Coating Composition "e",

The procedures of Example 1 were repeated to prepare an aqueous emulsion type release coating composition "e" wherein a pre-emulsion was prepared from a mixture of 10 parts of modified Et-VAl copolymer A, 5 parts of polyoxyethylene stearyl ether having EO content of 15 moles and an HLB of 13.5, 1 part of sodium lauryl-ether-sulfate and 18 parts of water, and the amount of water added after the pre-emulsification was changed to 66 parts with all other conditions remaining the same.

COMPARATIVE EXAMPLE 2
Preparation of Release Coating Composition, "f"

The procedures of Example 3 were repeated to prepare an aqueous emulsion type release coating composition "f" wherein a pre-emulsion was prepared from a mixture of 10 parts of modified Et-VAl copolymer A, 5 parts of polyoxyethylene stearyl ether having EO content of 15 moles and an HLB of 13.5, 1 part of sodium lauryl-ether-sulfate, 2 parts of decyl alcohol and 18 parts of water with all other conditions remaining the same.

Evaluation of Release Coating Compositions "a" through "f"

Storage stability of aqueous emulsion type release coating compositions "a" through "f", and peel strength and residual adhesion strength of the release coating compositions were evaluated by the following methods.

(1) Storage Stability

Each of the aqueous emulsion type release coating compositions was allowed to stand at a temperature of 40° C. for 24 hours, and the state of emulsion was visually observed by the naked eye. The state of emulsion. was expressed by the following two ratings A and B.

A: After the standing at 40° C. for 24 hours, no sedimentation, coagulation or separation was observed at all.

B: After the standing at 40° C. for 24 hours, sedimentation, coagulation or separation was observed.

(2) Peel Strength (g/25 mm)

Each of the aqueous emulsion type release coating compositions was diluted with water so that the concentration of each modified Et-VAl copolymer was 2% by weight based on the weight of the diluted emulsion type release coating composition.

One surface of a polyethylene terephthalate film having a thickness of 25 $\mu$m was coated with 0.05 g/m$^2$ (as the dried solid) of the diluted release coating composition. The thus-formed coating was dried at 100° C. for 60 seconds to prepare a release coating composition-coated polyethylene terephthalate film.

One surface of a polypropylene film having a thickness of 40 $\mu$m was subjected to a corona discharge treatment. In the same manner as employed for the polyethylene terephthalate film, the treated surface of the polypropylene film was coated with the above-mentioned diluted release coating composition, followed by drying to prepare a release coating composition-coated polypropylene film.

A pressure sensitive rubber adhesive tape (tradename "Carton" #640 supplied by Nichiban Co.) having a width of 25 mm was adhered under pressure on the release coating composition-coated surface of each film by using a rubber roll having a weight of 2.5 kg, and the thus-obtained laminate was allowed to stand at 23° C. for 24 hours to prepare a test specimen.

The peel strength (unit: g/25 mm) was measured on the specimen by a 180° peeling testing method using Autograph (type S-100 supplied by Shimadzu Corp.) at a separation rate of 0.3 mm/min.

(2) Residual Adhesion (g/25 mm)

The rubber adhesive tape of the test specimen prepared for the peel strength was peeled from the release coating composition-coated film. The peeled rubber adhesive tape was adhered under pressure on a stainless steel plate by using a rubber roll having a weight of 2.5 kg, and the thus-obtained laminate was allowed to stand at 23° C. for 24 hours to prepare a test specimen. The residual adhesion (unit: g/25 mm) was measured on the specimen by a 180° peeling testing method using Autograph (type S-100 supplied by Shimadzu Corp.) at a separation rate of 0.3 mm/min.

For comparison, the same pressure sensitive rubber adhesive tape as used for adhering it on the release coating composition-coated film surface for measuring the peel strength was adhered on the same stainless steel plate as used for measuring the residual strength. The peel strength of the thus-prepared laminate was measured by the same method as mentioned above as for the measurement of residual strength. The peel strength was 670 g/25 mm. When the residual adhesion as measured on the rubber adhesive tape peeled from the release coating composition-coated film is close to 670 g/25 mm, the undesirable migration of the modified Et-VAl copolymer to the adhesive layer of the rubber adhesive tape is reduced.

The evaluation results are shown in Table 1.

TABLE 1

|  | Example | | | | Comp Example | |
| --- | --- | --- | --- | --- | --- | --- |
|  | 1 | 2 | 3 | 4 | 1 | 2 |
| Aqueous emulsion release coating composition | a | b | c | d | e | f |
| Storage stability | A | A | A | A | A | A |

TABLE 1-continued

| | Example | | | | Comp Example | |
|---|---|---|---|---|---|---|
| | 1 | 2 | 3 | 4 | 1 | 2 |
| Peel strength | | | | | | |
| (g/25 mm)(PET) | 170 | 165 | 185 | 170 | 150 | 100 |
| (OPP) | 210 | 215 | 225 | 210 | 140 | 70 |
| Residual strength | | | | | | |
| (g/25 mm) (PET) | 610 | 610 | 620 | 605 | 250 | 220 |
| (OPP) | 585 | 580 | 590 | 585 | 200 | 170 |

*PET: Polyethylene terephthalate film
OPP: Polypropylene film

As seen from the comparison of Examples 1 to 4 with Comparative Examples 1 and 2, the release coating composition of the present invention exhibits good and balanced peeling strength and residual strength, and has good storage stability. Even when the as-coated release coating composition is dried for a short time (i.e., at 100° C. for 60 seconds), the intended satisfactory properties are obtained.

A combination of a nonionic surface active agent having an HJB of not larger than 12 with an ionic surface active agent is used as an emulsifier for the preparation of the aqueous emulsion type release coating composition of the present invention. Therefore, the modified Et-VAl copolymer is easily emulsified, and the resulting aqueous emulsion type release coating composition exhibits good and balanced releasability and residual strength and has good storage stability. There is no need of using an organic solvent, and therefore, the release coating composition is beneficial from a viewpoint of safety for human body.

What is claimed is:

1. An aqueous emulsion release coating composition consisting essentially of (i) a product produced by reaction of an ethylene-vinyl alcohol copolymer represented by the following formula (1):

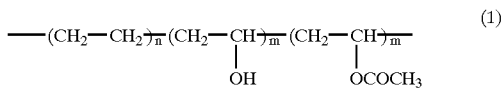
(1)

wherein the total of n, m and m' is an integer of 30 to 3,000, the ratio of n/(n+m+m') is in the range of 0.1 to 0.9, and the ratio of m/(m+m') is in the range of 0.9 to 1.0, with a $C_{8-30}$ alkyl isocyanate, and (ii) a surface active agent which is a combination of a nonionic surface active agent having a hydrophilic-lyophilic balance (HLB) of not larger than 12, with an ionic surface active agent, wherein the ratio of nonionic surface active agent/ionic surface active agent is in the range of 0.5 to 10 by weight.

2. An aqueous emulsion release coating composition according to claim 1, wherein the nonionic surface active agent is a polyoxyethylene alkyl-ether surface active agent.

3. An aqueous emulsion release coating composition according to claim 2, wherein the polyoxyethylene alkyl-ether surface active agent is a polyoxyethylene $C_{8-20}$ alkyl-ether.

4. An aqueous emulsion release coating composition according to claim 1, wherein the ionic surface active agent is an anionic surface active agent or a cationic surface active agent.

5. An aqueous emulsion release coating composition according to claim 1, wherein the amount of the nonionic surface active agent is in the range of 10 to 60% by weight based on the entire amount of the reaction product of the ethylene-vinyl alcohol copolymer of formula (1) with the $C_{8-30}$ alkyl isocyanate.

* * * * *